(12) United States Patent
Mohandas et al.

(10) Patent No.: US 12,723,900 B2
(45) Date of Patent: Sep. 1, 2026

(54) SENSOR CALIBRATION SYSTEM AND METHOD

(71) Applicant: Transportation IP Holdings, LLC, Norwalk, CT (US)

(72) Inventors: Avinash Mohandas, Bangalore (IN); Suseel Sukumaran, Bangalore (IN); Atul George Tharakan, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 783 days.

(21) Appl. No.: 18/155,247

(22) Filed: Jan. 17, 2023

(65) Prior Publication Data

US 2023/0258483 A1 Aug. 17, 2023

Related U.S. Application Data

(60) Provisional application No. 63/267,977, filed on Feb. 14, 2022.

(51) Int. Cl.
*G01D 18/00* (2006.01)

(52) U.S. Cl.
CPC ....... *G01D 18/006* (2013.01); *G01D 2218/00* (2021.05)

(58) Field of Classification Search
CPC .. G01D 18/006; G01D 2218/00; G01K 1/024; G01K 15/005; G01P 21/02; G01P 21/00; G01L 25/00
See application file for complete search history.

(56) References Cited

U.S. PATENT DOCUMENTS

| | | | | |
|---|---|---|---|---|
| 2015/0134289 | A1 | 5/2015 | Mrvaljevic et al. | |
| 2019/0107510 | A1* | 4/2019 | Gülfirat ............. | G01N 27/4163 |
| 2020/0048992 | A1 | 2/2020 | Williard et al. | |
| 2022/0003581 | A1 | 1/2022 | Fox et al. | |

OTHER PUBLICATIONS

Emiliano Miluzzo et al: "CaliBree: A Self-calibration System for Mobile Sensor Networks", Jun. 18, 2007 (Jun. 18, 2007), Distributed Computing in Sensor Systems : 4th IEEE International Conference, (19 pages).
Extended European Search Report for related EP App. No. 23153985.9 dated Jul. 7, 2023 (8 pages).

* cited by examiner

*Primary Examiner* — Lee E Rodak
*Assistant Examiner* — Byung Ro Lee
(74) *Attorney, Agent, or Firm* — K&L Gates LLP

(57) ABSTRACT

A sensor calibration system includes a controller configured to receive a first electrical output generated by a sensor while submitted to a first input condition and a second electrical output generated by the sensor while submitted to a second input condition. The first and second electrical outputs represent lower and upper limits, respectively, of a sensor measurement range. The controller obtains a first reference value that corresponds to the lower limit and a second reference value that corresponds to the upper limit, and determines a drift function of the sensor based on a value of the first electrical output, a value of the second electrical output, the first reference value, and the second reference value. The controller inputs a value of a raw electrical output generated by the sensor into the drift function to determine an adjusted value of the raw electrical output.

17 Claims, 2 Drawing Sheets

SENSOR CALIBRATION SYSTEM AND METHOD

CROSS-REFERENCE TO RELATED APPLICATIONS

This application claims priority to U.S. Provisional Patent Application No. 63/267,977, which was filed on 14 Feb. 2022, and the entire disclosure of which is incorporated herein by reference.

BACKGROUND

Technical Field

The subject matter described herein relates to calibration of sensors.

Discussion of Art

Sensors are used to monitor various properties of vehicles and other devices and machinery. Systems rely on accurate and consistent sensor measurements over time for control operations and for alerting an operator to the presence of unexpected alarm conditions. Unfortunately, sensors experience a gradual variation or drift in sensitivity over time, which can lead to inaccurate property measurements. The drift may be caused by various factors, such as material degradation in the sensor, environmental contamination of the active sensor elements, vibration or other mechanical forces, and the like. For example, a new pressure sensor may generate a 2.0 volt (V) output when exposed to a 75 pounds per square inch (psi) input condition. The 2.0 V value is converted via a function to a measured value of 75 psi. Due to drift over time, the same pressure sensor when exposed to the same input condition, 75 psi, may generate only a 1.8 V output. That 1.8 V value may be converted via the same function to a measured value of 68 psi. Thus, due to sensor drift, the used sensor provides an inaccurate sensor measurement (e.g., 68 psi measured value when the actual input is 75 psi).

In addition to reduced accuracy, sensor drift may cause an invalid out-of-range condition (e.g., a false positive) and/or may fail to detect an actual out-of-range condition (e.g., a false negative). For example, using the hypothetical example above, an upper limit of a permitted or expected property range for an engine component may be 73 psi. When the sensor is new and exposed to a 75 psi input condition, the sensor generates an output that is converted to a measured property value of 75 psi, and a control system generates an alert because the measured property is above the upper limit of 73 psi. However, the same sensor affected by drift would fail to detect this actual out-of-range condition. As described above, the drift-affected sensor may generate an output that is converted to a measured property value of 68 psi. The controller determines that 68 psi is within the allowed or expected range (e.g., is lower than 73 psi), so the controller fails to detect the out-of-range condition and does not generate an alert. This is an example of a false negative alert. Conversely, sensor drift may cause the controller to trigger an out-of-range alert based on an inaccurate sensor measurement, even though the actual value of the property is within the allowed or expected range. This is an example of a false positive sensor alert.

If it is determined that a sensor has experienced drift, the sensor is replaced by a new sensor. Replacing sensors to avoid or reduce the likelihood of inaccuracies due to drift can be expensive and wasteful of materials. In some instances, the sensor with drift can be manually recalibrated during maintenance to delay replacement. The manual recalibration process may involve disconnecting the sensor from the vehicle, device, or machinery, submitting the sensor to a test input condition via a calibration device, converting the electrical output of the sensor, when exposed to the test input condition, to a measured property value, and comparing the measured property value to the calibrated (e.g., actual) property value to determine an offset. The operator can then adjust the conversion function of the sensor from the value of the sensor output to the measured property value to reduce the offset. For example, an operator may make a note to "add 5 psi" to every measured pressure value by a given sensor. This manual recalibration process may be relatively inefficient and may be susceptible to human error with respect to adjusting the conversion between sensor outputs and measured property values. A need may exist for systems and methods for recalibrating sensors that are more efficient and accurate than known manual recalibration techniques.

BRIEF DESCRIPTION

In accordance with an embodiment, a sensor calibration system is provided that may include a controller comprising one or more processors and operably connected to a sensor. The controller may receive a first electrical output generated by the sensor while the sensor is submitted to a first input condition, and to receive a second electrical output generated by the sensor while the sensor is submitted to a second input condition. The first electrical output may represent a lower limit of a measurement range of the sensor, and the second electrical output represents an upper limit of the measurement range. The controller may obtain a first reference value that corresponds to the lower limit of the measurement range and a second reference value that corresponds to the upper limit of the measurement range. The controller may determine a drift function of the sensor based on a value of the first electrical output, a value of the second electrical output, the first reference value, and the second reference value. The controller may input a value of a raw electrical output generated by the sensor into the drift function to determine an adjusted value of the raw electrical output.

In accordance with an embodiment, a method is provided that may include receiving a first electrical output generated by a sensor while the sensor is submitted to a first input condition, and receiving a second electrical output generated by the sensor while the sensor is submitted to a second input condition. The first electrical output may represent a lower limit of a measurement range of the sensor, and the second electrical output may represent an upper limit of the measurement range. The method may include obtaining a first reference value that corresponds to the lower limit of the measurement range and a second reference value that corresponds to the upper limit of the measurement range. The method may include determining a drift function of the sensor based on a value of the first electrical output, a value of the second electrical output, the first reference value, and the second reference value. The method may include inputting a value of a raw electrical output generated by the sensor into the drift function to determine an adjusted value of the raw electrical output.

In accordance with an embodiment, a sensor calibration system is provided that may include a controller disposed onboard a vehicle and operably connected to a sensor onboard the vehicle. The controller may include one or more processors and may receive a first electrical output generated by the sensor indicative of a property of the vehicle or a property of a component of the vehicle. The first electrical output may be received from the sensor while the sensor is submitted to a first input condition, and the first electrical output may represent a lower limit of a measurement range of the sensor. The controller may receive a second electrical output generated by the sensor while the sensor is submitted to a second input condition. The second electrical output may represent an upper limit of the measurement range of the sensor. The controller may obtain a first reference value that corresponds to the lower limit of the measurement range and a second reference value that corresponds to the upper limit of the measurement range. The controller may determine a drift function of the sensor based on a value of the first electrical output, a value of the second electrical output, the first reference value, and the second reference value. The controller may input a value of a raw electrical output generated by the sensor into the drift function to determine an adjusted value of the raw electrical output, and may determine a measured value of the property monitored by the sensor by inputting the adjusted value of the raw electrical output into a second function.

BRIEF DESCRIPTION OF THE DRAWINGS

The inventive subject matter may be understood from reading the following description of non-limiting embodiments, with reference to the attached drawings, wherein below.

DETAILED DESCRIPTION

Figure 1:
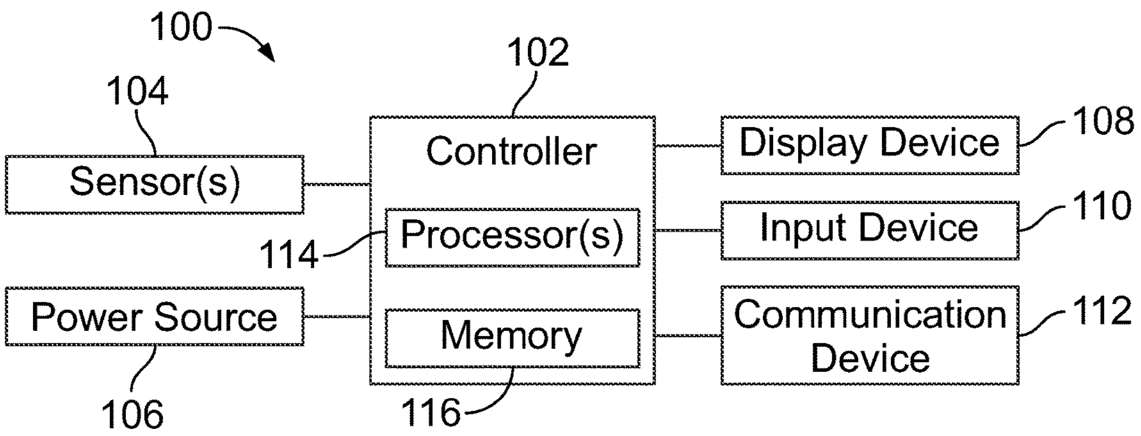
FIG. 1 is a schematic block diagram of a sensor calibration system according to an embodiment.

Embodiments of the subject matter described herein relate to a sensor calibration system and method of calibrating one or more sensors. The system and method may provide periodic calibration (e.g., recalibration) of one or more sensors to diminish, reduce or eliminate the effects of sensor drift and extend the operational life of the sensors. The effects may be inherent to the sensor operation in some embodiments. The systems and methods disclosed herein may calibrate various different types of sensors that monitor different properties or parameters. The systems and methods disclosed herein may calibrate the same sensors but in different use environments. Suitable sensor types can include those that measure physical conditions, electrical conditions, chemical conditions, and the like. Physical conditions may include temperature, pressure, acceleration, strain, and force. Electrical conditions may include power, voltage, current, and frequency. Current may be direct current or alternating current. Power may be active, reactive, or apparent power.

In one embodiment, the sensors to be calibrated may be disposed onboard a vehicle. The inventive subject matter described herein extends to various types of vehicles. Suitable vehicles may include rail vehicles, marine vessels, aircraft, buses, trucks (with or without trailers), automobiles, mining vehicles, agricultural vehicles, or other off-highway vehicles. The vehicles described herein (rail vehicles or other vehicles that do not travel on rails or tracks) can be part of a single vehicle system or a vehicle system of multiple vehicles. With respect to multi-vehicle systems, the vehicles can be mechanically coupled with each other (e.g., by couplers), or logically coupled but not mechanically coupled. For example, vehicles may be logically but not mechanically coupled when the discrete vehicles communicate with each other to coordinate movements of the vehicles with each other so that the vehicles travel together (e.g., as a convoy). In other embodiments, the system and method may calibrate one or more sensors that are stationary, such as those that are off-board a vehicle. Suitable stationary equipment sensors may be in a factory or plant, in a home, or the like.

In some of the embodiments described herein, systems and methods may account for changes in the sensor due to drift. Repeated calibration of a sensor over time by the sensor calibration system may enable the sensor to provide more accurate and precise sensor measurements after a given amount of operation (e.g., after one year of operation) than if the sensor with the given amount of operation is not calibrated. The increased accuracy may reduce the risk and likelihood of incorrect sensor out-of-range alerts (e.g., false negatives and false positives). Some embodiments of the system and method may protect hardware of the component that is monitored by the sensor(s) by providing an accurate and timely notification in response to a condition deviating from a permitted or expected range. Another supplemental effect of increased sensor accuracy over time may be a relatively extended operational life of the sensors that are periodically calibrated. Another technical effect may be a relatively reduced sensor replacement cost.

In one embodiment, the method of sensor calibration may be at least semi-automated. In another embodiment, the system may present step-by-step instructions to an operator for manual components of the calibration process. The system may prompt the operator for input during the calibration process, such as to confirm whether the operator would like to generate a new drift function for the sensor. In another embodiment, the sensor calibration method may be fully automated, such that involvement by a human operator is not required. In other embodiments, the system may track sensor performance over time, and may report performance changes that are greater than a designated threshold value. Further, if the drift adjustment change is measured the controller may predict when a replacement should be scheduled. Further still, variations that are determined to correspond to performance issues or equipment or component failures may be used by the controller to either (or both) change the operating parameters of the affected systems or to notify that maintenance (or additional prognostics/diagnostic services) may be needed.

FIG. 1 is a schematic block diagram of a sensor calibration system 100 according to an embodiment. The sensor calibration system in the illustrated embodiment may include a controller 102, one or more sensors 104, a power source 106, a display device 108, an input device 110, and a communication device 112. The controller may be operably connected to the sensors, the power source, the display device, the input device, and the communication device. The controller can communicate via signals with each of the components. In other embodiments, the sensor calibration system may lack one or more of the components shown in FIG. 1 and/or may include additional components not shown in FIG. 1. For example, the communication device may be optional.

The sensor calibration system calibrates at least one of the sensors. The controller may control the calibration operation according to the steps described herein. For example, the controller may generate control signals that are communicated to different components of the sensor calibration system for controlling operations of the different components to perform a sensor calibration process. The controller represents hardware circuitry that may include and/or is connected with one or more processors 114 (e.g., one or more microprocessors, integrated circuits, microcontrollers, field programmable gate arrays, etc.). The controller may include and/or is connected with a tangible and non-transitory computer-readable storage medium (e.g., memory) 116. The memory may store programmed instructions (e.g., software) that is executed by the one or more processors to perform operations of the controller described herein. For example, the controller may respond to stimulus, such as signals from the input device, according to the programmed instructions. The memory additionally or alternatively may store different information, such as a database of sensor information, a record of sensor calibrations, drift functions that are determined during the calibration process, and/or the like.

In an embodiment, the sensor calibration system is disposed onboard a vehicle. Components of the sensor calibration system may be integrated onboard the vehicle. For example, the input device and the display device may be located in a cab that is designed to be occupied by an operator of the vehicle. The controller optionally may be a vehicle controller that performs one or more vehicle control operations. For example, the vehicle controller may control a propulsion system and/or a brake system of the vehicle.

The one or more sensors of the sensor calibration system monitor different properties of the vehicle and/or components of the vehicle. For example, the sensors may monitor properties of an engine of the vehicle, such as temperature and pressure. The sensors may monitor properties of the vehicle, such as speed and acceleration of the vehicle. The sensors may monitor properties of an energy storage device (e.g., one or more batteries) and/or a power bus of the vehicle, such as voltage and current. Optionally, the sensors may include a proximity sensor, a distance sensor, an audio sensor, a fuel cell sensor, and/or the like. Although these sensors are described as sensors that are onboard a vehicle, the sensor calibration system may operate to calibrate one or more sensors offboard vehicles, such as sensors that monitor properties of stationary machinery and manufacturing facilities.

In an alternative embodiment, the components of the sensor calibration system, other than the one or more sensors, are separate and discrete from the vehicle. For example, the non-sensor components of the sensor calibration system shown in FIG. 1 may be compiled into a portable pack that is able to be moved from vehicle to vehicle to calibrate sensors onboard the different vehicles. The pack may include a housing with a handle that enables a human operator, robot, or machine to carry the pack to a vehicle, or to a sensor onboard the vehicle.

The display device may include a display screen and circuitry for displaying information on the display screen. For example, the display device may present information related to the sensor calibration process to an operator. The information on the display device may include alerts, notifications, status updates, prompts for operator instructions, and the like. The display device may be integrated into a propulsion-generating vehicle. Alternatively, the display device may be a component of a personal computing device, such as a tablet, laptop, smartphone, or the like that is communicatively connected to the controller via a wired or wireless communication pathway.

A suitable input device may be a computing device or a physical button, toggle, switch, or the like that enables an operator to provide user inputs to the controller. The user inputs may be instructions or commands, affirmations in response to prompts, and the like, as described herein. When the input device is a physical button, toggle, or switch, the input device may be connected to the controller via an electrical or optical cable. When the input device is a computing device, the input device may be integrated into the propulsion-generating vehicle or alternatively may be a tablet, laptop, smartphone, or the like that is communicatively connected to the controller via a wired or wireless communication pathway.

The communication device represents hardware circuitry that can wirelessly communicate electrical signals. For example, the communication device can represent transceiving circuitry, one or more antennas, and the like. The transceiving circuitry may include a transceiver or a separate transmitter and receiver. The electrical signals can form data packets that in the aggregate represent messages. In an embodiment, the communication device is a radio that wirelessly communicates the electrical signals as radio frequency (RF) signals. The communication device may transmit or broadcast messages that are generated by the controller of the sensor calibration system. The communication device may receive messages and forward the received messages to the controller for analysis.

The power source provides electrical power to power operations of the sensor calibration system. The power source may include an energy storage device, such as one or more batteries, capacitors, or the like. The energy storage device may be rechargeable. Alternatively, the power source may include power electronics for connecting to an external power supply. The external power supply may be an electrical power circuit onboard a vehicle, and the power electronics may include components for conveying electric current from the power circuit to the controller and other components of the sensor calibration system.

Figure 2:
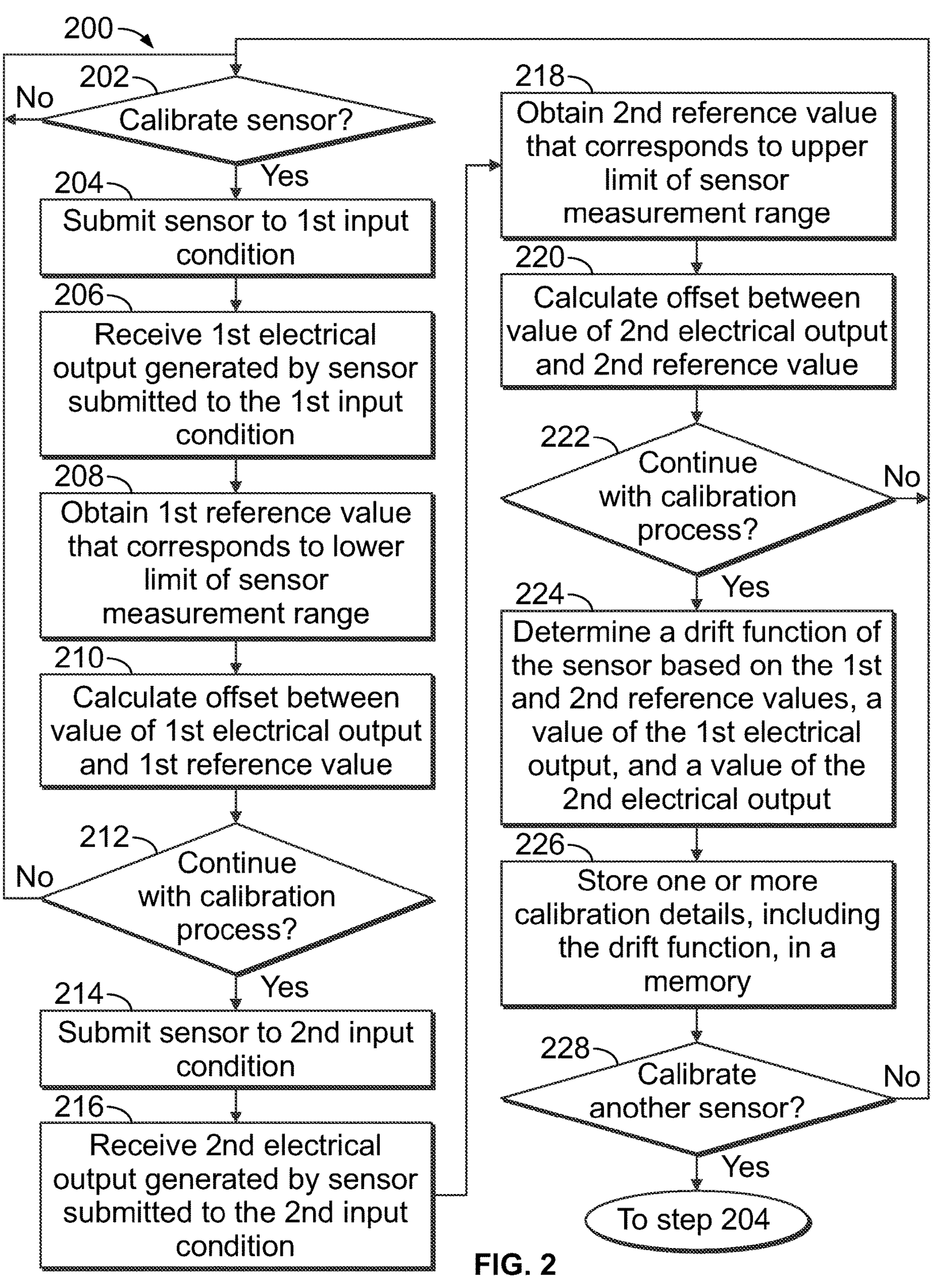
FIG. 2 is a flow chart of a method for calibrating a sensor according to an embodiment.

FIG. 2 is a flow chart of a method 200 for calibrating a sensor according to an embodiment. The method may be performed in whole or at least in part by the controller of the sensor calibration system shown in FIG. 1. The method optionally may include more steps than shown in FIG. 2, fewer steps than shown in FIG. 2, and/or different steps than shown in FIG. 2. Furthermore, the order of the steps presented in FIG. 2 may be rearranged unless explicitly stated and unless such a rearranged order would not be practically feasible. At step 202, it is determined whether it is time to calibrate a sensor. For example, the controller of the sensor calibration system may refer to a designated schedule that provides time periods or intervals at which to calibrate (e.g., recalibrate) each sensor. The schedule may be stored in the memory of the controller. The schedule may dictate that a given sensor should be calibrated at a designated period based on time or usage. For example, a sensor that monitors a propulsion system of a rail vehicle may be calibrated once a year, once every 40,000 miles of travel, or another increment. Optionally, several sensors of a system (e.g., a vehicle) may be scheduled for calibration at the same time. The calibration schedule may be based on the susceptibility of the sensors to experiencing drift. For example, sensors that are more susceptible to drift may be scheduled for more frequency calibration than sensors that are less susceptible to drift. The susceptibility to drift may be based on the materials of the sensors, the complexity and/or working principles of the active elements, the risk of external contamination, and/or the like.

Determination that a given sensor is, or should be, scheduled for calibration, then the flow proceeds to step 204. If no sensors are scheduled for calibration at the current time of inquiry, then flow stops because it is not time to perform the sensor calibration process. Optionally, an operator may selectively initiate the sensor calibration process for a sensor, even if that sensor is not due for a scheduled calibration. For example, the operator may use the input device to input a command to start the process. The operator may initiate the calibration process for a sensor based on a suspicion that measured property values based on electrical outputs of the sensor are inaccurate. If the operator initiates the calibration process, then flow proceeds to step 204.

At step 204, the sensor to be calibrated is submitted to a first input condition. The input condition is based on the type of sensor. For example, if the sensor is a temperature sensor, the input condition involves exposing the sensor to a controlled temperature environment. For a pressure sensor, the input condition involves exposing the sensor to a controller pressure environment. For voltage sensors and current sensors, the input condition may involve conveying a controlled electrical input (e.g., voltage, current, phase, etc.) to the respective sensor.

For sensors that require exposure to controlled physical environments, the first input condition may involve introducing the sensor to a calibration device. For example, a temperature sensor may be inserted into a thermo-well part of a temperature calibrator, and a pressure sensor may be coupled to a master gauge of a pressure calibrator. The introduction and/or connection between the sensor and the calibration device may be manually performed by an operator. Optionally, the controller at step 204 may generate a control signal to display a prompt on the display device that instructs the operator to introduce the sensor to the calibration device. In general, the controller may utilize the display device and/or other output devices (e.g., audio speakers) throughout the calibration process to provide status updates to the operator, to prompt the operator to perform a task (e.g., introduce the sensor to a calibration device), and provide detailed instructions for correctly performing the requested task. Optionally, the introduction of the sensor to a calibration device may be automated via the use of actuators and/or robots. For example, the calibration device may be mechanically connected to a robotic arm that is controlled to selectively couple the sensor to the calibration device without manual intervention or participation by an operator. The robotic arm may be designed to move the calibration device to multiple different sensors for calibrating each of the sensors in sequence using the same calibration device. The controller may use the communication device to wirelessly control the calibration device via control signals. For example, once the calibration device is in place relative to the sensor, the controller may control the calibration device to establish the first input condition. The control signals generated by the controller may specify a temperature setting of the calibration device, a pressure setting of the calibration device, or the like corresponding to the first input condition.

For sensors that do not require controlled physical environments, such as voltage and current sensors, the controller may submit the sensor to the first input condition by controlling a flow of electric current from the power source of the sensor calibration system to the sensor. For example, the controller may generate a control signal that actuates one or more electrical switch devices to establish a closed conductive path that conveys electric current from the power source to the sensor. The controller may control the switch devices and/or other circuit elements along the closed conductive path to alter one or more characteristics of the electric current that is supplied to the sensor to define the first input condition. The one or more characteristics that are altered may include impedance, amplitude, frequency, phase, or the like. The conveyance of electric current to the sensor may be autonomously performed by the controller without human intervention.

In an embodiment, the first input condition is selected to elicit the sensor to generate an electrical output at a lower limit of a measurement range of the sensor. The measurement range of the sensor refers to the rated (or intended) capability range of the sensor. For example, the sensor is designed to monitor properties (or parameters) that are within the measurement range of the sensor, and is not designed to monitor properties that are outside of the measurement range. The measurement range optionally may include two interrelated components, such as a range of the measured property (e.g., temperature or pressure) and a range of the raw electrical sensor output (e.g., voltage or current) before the output is converted to the measured property. For example, a temperature sensor may be designed to monitor temperatures within a range from 0° C. to 100° C. When the temperature sensor is new and initially calibrated, the sensor may generate an electrical output of 0 V when the temperature in the ambient environment is 0° C., and may generate an electrical output of 2 V when the ambient environment is at 100° C. As such, the measurement range of the temperature sensor may include 0-2 V and 0-100° C. The lower limit of the measurement range is 0 V and 0° C. because the sensor does not generate any output less than 0 V and is not designed to measure any temperature lower than 0° C. The lower limit of the sensor output may be non-zero in another embodiment, such as 0.5 V. In this hypothetical the first input condition may involve exposing the temperature sensor to an environment with a temperature of 0° C. or less, such as −10° C. Exposing the sensor to a condition at or below the lower limit of the measurement range is designed to determine the lowest sensor output that the sensor can generate at the current time. Due to drift, the lowest sensor output may deviate over time from the initial value when the sensor is new.

At step 206, the controller receives a first electrical output generated by the sensor while the sensor is submitted to the first input condition. For example, the sensor may generate the first electrical output in response to experiencing the first input condition. The first electrical output may be a voltage, a current, or the like. The sensor may be communicatively connected to the controller such that the first electrical output is conveyed to the controller via a wired or wireless communication pathway. The first electrical output represents a lower limit of the measurement range that is output by the sensor. After receiving the first electrical output, the controller may store a value of the first electrical output in the memory.

At step 208, the controller obtains a first reference value that corresponds to the lower limit of the measurement range of the sensor. The first reference value, also referred to herein as a reference lower limit, may be based on default settings of the sensor and/or settings achieved when the sensor was new (e.g., settings uninfluenced by drift). In an example, the sensor may be designed to generate, as the sensor output, electric currents between 4 mA and 20 mA. The 4 mA output would be the reference lower limit. The 20 mA would be a second reference value, or reference upper limit, which corresponds to the upper limit of the measurement range of the sensor. The first reference value may be obtained by retrieving the value from a database that stores such reference values for different sensors. For example, the memory of the controller may include a calibration file in a database, where the calibration file identifies various sensors and associates each of the sensors with corresponding reference upper and lower limits. The controller (e.g., one or more processors thereof) may access the calibration file and look up the specific sensor based on identification information to retrieve the reference upper and lower limits associated with that sensor.

Optionally, at step 210, the controller may calculate a delta, or offset, between a value of the first electrical output of the sensor and the first reference value corresponding to the lower limit of the measurement range. This offset represents the deviation of the sensor output from the initial or expected conditions (e.g., the first reference value) to the present conditions (e.g., the value of the first electrical output). Such deviation may be attributable to sensor drift over time. In a hypothetical example, the first reference value or reference lower limit may be 4 mA, and yet when exposing the sensor at current time to the first input condition the value of the first electrical output may be 6 mA. The offset would be calculated as a magnitude 2 mA (e.g., 6 mA minus 4 mA).

The controller may display the offset between the value of the first electrical output and the first reference value on the display device. Optionally, the controller may display the value of the first electrical output and the first reference value on the display device instead of, or in addition, to displaying the offset between the two values. For example, the controller may generate a control signal that controls the display device to present this information on a graphical user interface (GUI).

At step 212, the controller may prompt the operator for approval or confirmation before continuing with the sensor calibration process. This prompt may be in the form of a text-based message that is displayed on the GUI. Virtual buttons may be presented on the GUI for continuing with the calibration process or exiting the calibration process. For example, an operator may decide to exit the calibration process if the offset is excessively high. An excessively high offset may indicate that the sensor is faulty and should be replaced rather than recalibrated. The excessively high offset may be determined based on operator preferences or may be a designated percentage change relative to the reference value (e.g., greater than 50%).

If approval is received to continue the calibration process, or alternatively if the method omits step 212, then flow continues to step 214 in which the sensor is submitted to a second input condition. Submitting the sensor to the second input condition may be similar to submitting the sensor to the first input condition except for the characteristics of the condition itself. For example, the second input condition is selected to elicit the sensor to generate an electrical output at the upper limit of the measurement range of the sensor. For a temperature sensor that is designed to measure temperature in a range of from zero degrees Celsius (0° C.) to 100° C., for example, the 100° C. represents the upper limit of a property measurement range. If the sensor when new and initially calibrated generates an output of 2 V when exposed to 100° C., then the 2 V represents an output measurement range of the sensor. The upper limits of the measurement range are 2 V and 100° C. because the sensor is not designed to generate any output greater than 2 V and is not designed to measure any temperature greater than 100° C. In this hypothetical the second input condition may involve exposing the temperature sensor to an environment with a temperature of 100° C. or greater, such as 110° C. Exposing the sensor to a condition at or greater than the upper limit of the property measurement range is designed to determine the highest sensor output that the sensor can generate at the current time. Due to drift, the highest sensor output may deviate over time from the initial value when the sensor is new (or at least less old). As described above with respect to the first input condition, submitting the sensor to the second input condition may involve modifying the settings of a calibration device, conveying a second electrical input to the sensor, or the like.

At step 216, the controller receives a second electrical output generated by the sensor while the sensor is submitted to the second input condition. For example, the sensor may generate the second electrical output in response to experiencing the second input condition. The second electrical output may be a voltage, a current, or the like. The second electrical output may be conveyed to the controller via the wired or wireless communication pathway between the controller and the sensor. The second electrical output represents the upper limit of the sensor output measurement range (at the current time). After receiving the second electrical output, the controller may store a value of the second electrical output in the memory.

At step 218, the controller obtains the second reference value that corresponds to the upper limit of the measurement range. As described above with reference to step 208, the second reference value, also referred to herein as a reference upper limit, may be based on default settings of the sensor and/or settings achieved when the sensor was new (e.g., settings uninfluenced by drift). In the example in which the sensor is designed to output electric currents between 4 mA and 20 mA, the 20 mA output would be the reference upper limit. The second reference value may be obtained by retrieving the value (along with the first reference value) from a database that stores such reference values for different sensors. The controller (e.g., one or more processors thereof) may access the calibration file and look up the specific sensor based on identification information to retrieve the reference upper and lower limits associated with that sensor.

Optionally, at step 220, the controller may calculate a second delta or offset between the value of the second electrical output and the second reference value corresponding to the upper limit of the measurement range. This second offset represents the deviation of the sensor output from the initial or expected conditions (e.g., the second reference value) to the present conditions (e.g., the value of the second electrical output). Such deviation may be attributable to sensor drift over time. In a hypothetical example, the second reference value or reference upper limit may be 20 mA, and yet when exposing the sensor at the current time to the second input condition the value of the second electrical output may be 18 mA. The offset would be calculated as a magnitude 2 mA (e.g., 20 mA minus 18 mA). In this example, the measurement range of the sensor may compress over time due to sensor drift.

The controller may display the second offset between the value of the second electrical output and the second reference value on the display device. Optionally, the controller may display the value of the second electrical output and the second reference value on the display device instead of, or in addition, to displaying the offset between these two values. For example, the controller may generate a control signal that controls the display device to present this information on the GUI.

At step 222, the controller may prompt the operator for approval or confirmation before continuing with the sensor calibration process. This prompt may be in the form of a text-based message that is displayed on the GUI. Virtual buttons may be presented on the GUI for continuing with the calibration process or exiting the calibration process. For example, as described above with reference to step 212, an operator may decide to exit the calibration process if the offset is excessively high, which may be indicative of a faulty (e.g., non-functioning) sensor that should be replaced instead of recalibrated.

At step 224, the controller determines a drift function of the sensor based on the value of the first electrical output, the value of the second electrical output, the first reference value, and the second reference value. In an embodiment, the controller determines the drift function by calculating an equation of a line (e.g., y=mx+b) through a first point and a second point. The first point is defined by the value of the first electrical output ($x_1$) and the first reference value ($y_1$). The first point corresponds to the lower limit of the measurement range. The second point is defined by the value of the second electrical output ($x_2$) and the second reference value ($y_2$), such that the second point corresponds to the upper limit of the measurement range. Using these known points, the slope of the drift function can be determined using equation (1):

$$m = \frac{(y_2 - y_1)}{(x_2 - x_1)} \quad (1)$$

The $y_2$-$y_1$ element of equation (1) reflects a first delta or offset between the second reference value, which represents the default upper limit of the sensor, and the first reference value, which represents the default lower limit of the sensor. The $x_2-x_1$ element of equation (1) reflects a second delta or offset between the value of the second electrical output, responsive to the sensor being submitted to the second input condition at or above the property measurement upper limit, and the value of the first electrical output, responsive to the sensor being submitted to the first input condition at or below the property measurement lower limit. The slope is calculated by dividing the first offset by the second offset. In an example, if the default measurement range is from 0 V to 2 V, then $y_2=2$ and $y_1=0$, so the first offset $y_2-y_1$ equals 2. If the value of the first electrical output is 0.25 V and the value of the second electrical output is 2.1 V, then $x_2=2.1$ and $x_1=0.25$, so the second offset $x_2$-$x_1$ equals 1.85. Dividing the first offset 2 by the second offset 1.85 provides a slope m of 1.081.

Once the slope is calculated, the y-intercept b can be calculated by plugging in the slope value and the coordinates of either known point into the equation of a line rearranged to solve for the y-intercept: b=y−mx. For example, the slope may be multiplied by the value of the first electrical output to obtain a first product, and then the first product is subtracted from the first reference value to calculate the y-intercept. Alternatively, the slope may be multiplied by the value of the second electrical output to obtain a second product, and the second product is subtracted from the second reference value to calculate the y-intercept. In this example case, using the values of the first point ($x_1$, $y_1$) provides the following, b=0−1.081*0.25. The y-intercept equals −0.27. The drift function is determined to be: y=1.081x−0.27. This drift function is used to adjust the raw sensor outputs during future operation of the sensor to reduce the effects of drift.

After determining the drift function, the controller may notify an operator that the calibration is complete. For example, the controller may generate a control signal that controls the display device to present a text-based alert on the display screen.

At step 226, the controller may store the drift function that is determined in the memory. For example, the controller may generate a record of the calibration event, which may include various details such as a time stamp, an identification of the sensor that is calibrated, the drift function that is determined, the values of the first and second sensor electrical outputs, and/or the like. Alternatively, the controller may use the communication device to communicate one or more of the calibration details to a remote device, such as a server for remote storage and/or analysis of the calibration details.

At step 228, it is determined whether or not to calibrate any other sensors, such as other sensors onboard the same vehicle as the sensor that was just calibrated. The controller may make this determination by consulting the designated schedule. Optionally, the operator may be able to override the controller using the input device, such as to select one or more additional sensors to calibrate. If calibration of another sensor is selected at step 228, then flow of the method returns to step 204 and the new sensor to be calibrated is submitted to a first input condition. If, on the other hand, no additional calibration is requested or scheduled at this time, then the calibration process may end. Flow may return to step 202, where the controller periodically checks if any sensors are scheduled for a calibration.

After the calibration process is complete, the drift function is used by the controller during operation of the sensor. For example, the controller receives raw electrical outputs generated by the sensor via a wired or wireless communication pathway. The raw electrical outputs may be generated by the sensor periodically or in response to a triggering event. In an embodiment, each time the controller receives a raw electrical output from the sensor, the controller inputs a value of the raw electrical output into the drift function to determine an adjusted value of the raw electrical output. The raw electrical output may be plugged into the equation as the x variable, and the solved y variable represents the adjusted value of the raw electrical output. For example, assuming that the value of a raw electrical output of the sensor is 1.2 V, the controller inputs this value into the drift function and calculates the adjusted value as 1.081*1.2−0.27, which solves to 1.027.

The controller may determine a measured value of a property monitored by the sensor by inputting the adjusted value of the electrical output into a second function. The second function converts the electrical output to the measured property, such as temperature, pressure, speed, acceleration, strain, distance, voltage, current, and/or the like. In an embodiment, the calibration process does not affect or modify the second function that converts the sensor output to the measured property or parameter. Rather, the calibration process simply modifies the value of the electrical output generated by the sensor, which is the value that is input into that second function. The output of the second function is a measured value of the property monitored by the sensor. Optionally, the controller may display the measured value on the display device for observation by the operator.

In an embodiment, the controller may compare the measured value of the property to an expected value or a designated tolerable range. If the measured value is determined to be outside of the designated tolerable range and/or deviates from the expected value by more than a designated margin (e.g., 20%, 30%, or the like), the controller may determine that the measured value is out of range. If the measured value is out of range, the controller may generate a control signal to alert an operator. The alert notifies the operator that the monitored property deviating from the expected or desired values, which may require the operator to modify operation of the vehicle, machinery, device, or system, or to schedule maintenance.

Figure 3:
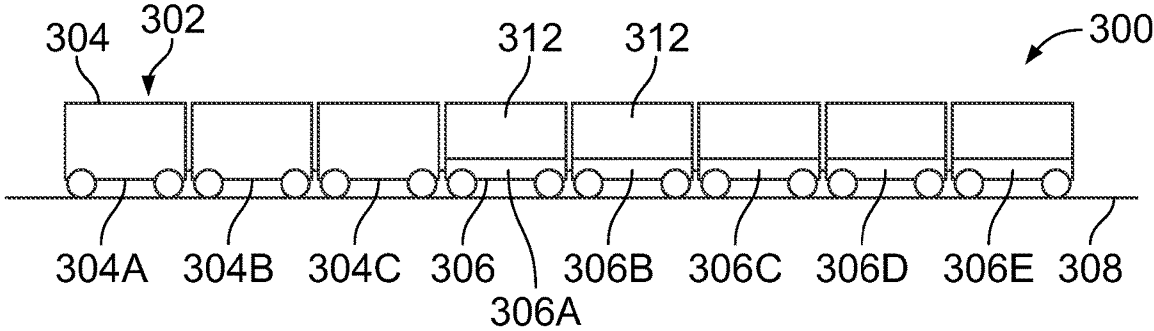
FIG. 3 illustrates a vehicle system that includes the sensor calibration system described herein.

FIG. 3 illustrates a vehicle system 300 that may include the sensor calibration system described herein. The vehicle system may include several types of vehicles 304, 306 that may travel along a route 308. The vehicles 304A-C are propulsion-generating vehicles that generate tractive effort and/or power to propel the vehicle system along the route. The vehicles 306A-E are non-propulsion-generating vehicles that do not generate tractive effort or power. Some of the non-propulsion-generating vehicles may be disposed between propulsion-generating vehicles. The non-propulsion-generating vehicles include brake systems but lack propulsion systems. The non-propulsion-generating vehicles may be mechanically coupled to each other and to the propulsion-generating vehicles, such that the propulsion-generating vehicles propel the non-propulsion-generating vehicles along the route. The non-propulsion-generating vehicles may be designed to carry cargo containers 312. Suitable cargo containers include intermodal containers, boxes, crates, pallets, and the like. Although the vehicle system is illustrated with three propulsion-generating vehicles and five non-propulsion-generating vehicles, the vehicle system can have more or less propulsion-generating vehicles and more or less non-propulsion-generating vehicles by coupling additional vehicles and/or uncoupling and removing some of the existing vehicles. For example, the vehicle system may have a few as one propulsion-generating vehicle and as few as zero non-propulsion-generating vehicles.

The sensor calibration system may be selectively disposed on one or more of the propulsion-generating vehicles of the vehicle system. For example, each propulsion-generating vehicle may include multiple sensors for monitoring different properties of the vehicle or components thereof, such as battery packs, fuel cells, propulsion systems, and the like. The sensor calibration system may periodically calibration the sensors onboard the vehicle according to the process described herein. In one embodiment, the sensor calibration system is portable, and may be applied to a system for a single use, or may be placed for use over a period of time before being moved to another system or location.

In an embodiment, the vehicle system is a train and the route is a railroad track. The propulsion-generating vehicles are locomotives. The non-propulsion-generating vehicles may be railcars that carry cargo. In another embodiment, the vehicle system is a road convoy or platoon, and the route is a paved road or unpaved path. For example, the propulsion-generating vehicles may be trucks (e.g., highway semi-trucks, mining trucks, logging trucks, or the like), and the non-propulsion-generating vehicles may be trailers coupled to the trucks. In yet other embodiments, the vehicles may be other types of vehicles such as vans, cars, water vessels (e.g., tugs, barges), and the like. Some suitable vehicles may have electric drive systems, which may be powered (when using on-board power) using fuel cells or batteries. In one embodiment, the system is coupled to a charging station for an electric vehicle. A suitable charging station may be an overhead pantograph, a third rail, a wireless power transfer device and the like.

Embodiments of the sensor calibration system and method described may reduce or eliminate the effects of sensor drift over time. Drift effect reduction may increase the accuracy of the sensors, reduces the risk of false positive and false negative out-of-range alerts, and extends the operational lifetime of the sensors. The sensor calibration system and method may be performed entirely or in part by hardware and software components already onboard a vehicle, which may reduce costs and avoid retrofitting. In some embodiments, the sensor calibration system and method may be at least semi-autonomous. Semi-autonomous methods may be relatively more efficient than more manual processes and more accurate because of the reduced likelihood of human error.

In an embodiment, sensor calibration system may include a controller that may include one or more processors and operably connected to a sensor. The controller may receive a first electrical output generated by the sensor while the sensor is submitted to a first input condition, and to receive a second electrical output generated by the sensor while the sensor is submitted to a second input condition. The first electrical output represents a lower limit of a measurement range of the sensor, and the second electrical output represents an upper limit of the measurement range. The controller may obtain a first reference value that corresponds to the lower limit of the measurement range and a second reference value that corresponds to the upper limit of the measurement range, and to determine a drift function of the sensor based on a value of the first electrical output, a value of the second electrical output, the first reference value, and the second reference value. The controller may input a value of a raw electrical output generated by the sensor into the drift function to determine an adjusted value of the raw electrical output.

Optionally, the controller may determine a measured value of a property monitored by the sensor by inputting the adjusted value of the raw electrical output into a second function. The controller may display the measured value of the property on a display device. The controller may be configured to compare the measured value of the property to an expected range of the property and to generate a control signal that can alert a user in response to the measured value being outside of the expected range.

Optionally, the controller may determine the drift function by calculating an equation of a line through a first point and a second point. The first point may be defined by the value of the first electrical output and the first reference value. The second point may be defined by the value of the second electrical output and the second reference value. Optionally, the controller may periodically update the drift function over time according to a designated schedule based on an updated value of the first electrical output generated by the sensor, while submitted to the first input condition, and an updated value of the second electrical output generated by the sensor, while submitted to the second input condition.

Optionally, the controller may obtain the first and second reference values from a database within a computer-readable storage medium. Optionally, the controller may calculate an offset between the value of the first electrical output and the first reference value, generate a first control signal configured to present the offset on a display device for view by a user, and generate a second control signal to prompt the user to confirm that the offset is acceptable prior to determining the drift function of the sensor. Optionally, the sensor calibration system may include the sensor, which may be at least one of a pressure sensor, a temperature sensor, a voltage sensor, or a current sensor. The first reference value and the second reference value may correspond to the lower limit and the upper limit of the measurement range, respectively, at a time that the sensor is new. Optionally, the controller may generate a control signal that one or more of displays a notification on a display device that the sensor has been recalibrated or updates a database in a computer-readable storage medium with recalibration information of the sensor.

In an embodiment, a method is provided that may include receiving a first electrical output generated by a sensor while the sensor is submitted to a first input condition, and receiving a second electrical output generated by the sensor while the sensor is submitted to a second input condition. The first electrical output represents a lower limit of a measurement range of the sensor, and the second electrical output represents an upper limit of the measurement range. The method may include obtaining a first reference value that corresponds to the lower limit of the measurement range and a second reference value that corresponds to the upper limit of the measurement range, and determining a drift function of the sensor based on a value of the first electrical output, a value of the second electrical output, the first reference value, and the second reference value. The method may include inputting a value of a raw electrical output generated by the sensor into the drift function to determine an adjusted value of the raw electrical output.

Optionally, the method may include determining a measured value of a property monitored by the sensor by inputting the adjusted value of the raw electrical output into a second function. The method may include displaying the measured value of the property on a display device. Optionally, the drift function is determined by calculating an equation of a line through a first point and a second point. The first point is defined by the value of the first electrical output and the first reference value. The second point is defined by the value of the second electrical output and the second reference value. Optionally, the method may include periodically updating the drift function over time according to a designated schedule based on an updated value of the first electrical output generated by the sensor while submitted to the first input condition and an updated value of the second electrical output generated by the sensor while submitted to the second input condition.

Optionally, the method may include coupling the sensor to a calibration device which sequentially submits the sensor to the first input condition and the second input condition. Optionally, the method may include generating a control signal to convey a first electrical input to the sensor to submit the sensor to the first input condition and to convey a second electrical input to the sensor to submit the sensor to the second input condition. Optionally, the first and second reference values are obtained from a database. Optionally, the method may include calculating an offset between the value of the first electrical output and the first reference value, presenting the offset on a display device for viewing by a user, and generating a control signal to prompt the user to confirm that the offset is acceptable prior to determining the drift function.

In one embodiment, determining the drift function of the sensor may determine a slope by calculating a first offset between the first reference value and the second reference value, calculating a second offset between value of the first electrical output and the value of the second electrical output, and dividing the first offset by the second offset. Determining the drift function of the sensor may include determining a y-intercept by one of (i) multiplying the slope by the value of the first electrical output to obtain a first product, and subtracting the first product from the first reference value, or (ii) multiplying the slope by the value of the second electrical output to obtain a second product, and subtracting the second product from the second reference value.

In an embodiment, a sensor calibration system may include a controller. The controller may be disposed onboard a vehicle and may be operably connected to a sensor that is also onboard the vehicle. The controller may include one or more processors and may receive a first electrical output generated by the sensor indicative of a property of the vehicle or a property of a component of the vehicle. The first electrical output is received from the sensor while the sensor is submitted to a first input condition, and the first electrical output represents a lower limit of a measurement range of the sensor. The controller may receive a second electrical output generated by the sensor while the sensor is submitted to a second input condition. The second electrical output represents an upper limit of the measurement range of the sensor. The controller may obtain a first reference value that corresponds to the lower limit of the measurement range and a second reference value that corresponds to the upper limit of the measurement range. The controller may determine a drift function of the sensor based on a value of the first electrical output, a value of the second electrical output, the first reference value, and the second reference value. The controller may input a value of a raw electrical output generated by the sensor into the drift function to determine an adjusted value of the raw electrical output, and to determine a measured value of the property monitored by the sensor by inputting the adjusted value of the raw electrical output into a second function.

In one embodiment, the controllers or systems described herein may have a local data collection system deployed and may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via backpropagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term may include tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A sensor calibration system comprising:

a controller comprising one or more processors and operably connected to a sensor, the controller configured to:

receive a first electrical output generated by the sensor while the sensor is submitted to a first input condition, the first electrical output representing a lower limit of a measurement range of the sensor;

receive a second electrical output generated by the sensor while the sensor is submitted to a second input condition, the second electrical output representing an upper limit of the measurement range of the sensor;

obtain a first reference value that corresponds to the lower limit of the measurement range and a second reference value that corresponds to the upper limit of the measurement range;

determine a drift function of the sensor based on a value of the first electrical output, a value of the second electrical output, the first reference value, and the second reference value, wherein the drift function is based on a slope for a first offset value and a second offset value, wherein the first offset value is based on the first reference value and the second reference value, and the second offset value is based on the first electrical output and the second electrical output;

input a value of a raw electrical output generated by the sensor into the drift function to determine an adjusted value of the raw electrical output, wherein a percent change of the first offset value or the adjusted value is within a designated threshold value to calibrate the sensor; and determine a measured value of a property monitored by the sensor by inputting the adjusted value of the raw electrical output into a second function.

2. The sensor calibration system of claim 1, wherein the controller is configured to display the measured value of the property on a display device.

3. The sensor calibration system of claim 1, wherein the controller is configured to compare the measured value of the property to an expected range of the property and to generate a control signal configured to alert a user in response to the measured value being outside of the expected range.

4. The sensor calibration system of claim 1, wherein the controller is configured to determine the drift function by calculating an equation of a line through a first point and a second point, the first point defined by the value of the first electrical output and the first reference value, the second point defined by the value of the second electrical output and the second reference value.

5. The sensor calibration system of claim 1, wherein the controller is configured to periodically update the drift function over time according to a designated schedule based on an updated value of the first electrical output generated by the sensor while submitted to the first input condition and an updated value of the second electrical output generated by the sensor while submitted to the second input condition.

6. The sensor calibration system of claim 1, wherein the controller is configured to obtain the first and second reference values from a database within a computer-readable storage medium.

7. The sensor calibration system of claim 1, wherein the controller is configured to calculate an offset between the value of the first electrical output and the first reference value, generate a first control signal configured to present the offset on a display device for view by a user, and generate a second control signal to prompt the user to confirm that the offset is acceptable prior to determining the drift function of the sensor.

8. The sensor calibration system of claim 1, further comprising the sensor, the sensor being at least one of a pressure sensor, a temperature sensor, a voltage sensor, or a current sensor.

9. The sensor calibration system of claim 1, wherein the first reference value and the second reference value correspond to the lower limit and the upper limit of the measurement range, respectively, at a time that the sensor is new.

10. The sensor calibration system of claim 1, wherein the controller is configured to generate a control signal that one or more of displays a notification on a display device that the sensor has been recalibrated or updates a database in a computer-readable storage medium with recalibration information of the sensor.

11. A method comprising:

receiving a first electrical output generated by a sensor while the sensor is submitted to a first input condition, the first electrical output representing a lower limit of a measurement range of the sensor;

receiving a second electrical output generated by the sensor while the sensor is submitted to a second input condition, the second electrical output representing an upper limit of the measurement range of the sensor;

obtaining a first reference value that corresponds to the lower limit of the measurement range and a second reference value that corresponds to the upper limit of the measurement range;

determining a drift function of the sensor based on a value of the first electrical output, a value of the second electrical output, the first reference value, and the second reference value, wherein the drift function is based on a slope for a first offset value and a second offset value, and wherein the first offset value is based on the first reference value and the second reference value, and the second offset value is based on the first electrical output and the second electrical output;

inputting a value of a raw electrical output generated by the sensor into the drift function to determine an adjusted value of the raw electrical output, wherein a percent change of the first offset value or the adjusted value is within a designated threshold value to calibrate the sensor; and determining a measured value of a property monitored by the sensor by inputting the adjusted value of the raw electrical output into a second function.

12. The method of claim 11, further comprising displaying the measured value of the property on a display device.

13. The method of claim 11, wherein the drift function is determined by calculating an equation of a line through a first point and a second point, the first point defined by the value of the first electrical output and the first reference value, the second point defined by the value of the second electrical output and the second reference value.

14. The method of claim 11, further comprising periodically updating the drift function over time according to a designated schedule based on an updated value of the first electrical output generated by the sensor while submitted to the first input condition and an updated value of the second electrical output generated by the sensor while submitted to the second input condition.

15. The method of claim 11, further comprising coupling the sensor to a calibration device which sequentially submits the sensor to the first input condition and the second input condition.

16. The method of claim 11, wherein determining the drift function of the sensor comprises determining a y-intercept by one of (i) multiplying the slope by the value of the first electrical output to obtain a first product, and subtracting the first product from the first reference value, or (ii) multiplying the slope by the value of the second electrical output to obtain a second product, and subtracting the second product from the second reference value.

17. A sensor calibration system comprising:

a controller disposed onboard a vehicle and operably connected to a sensor onboard the vehicle, the controller comprising one or more processors and configured to:

receive a first electrical output generated by the sensor indicative of a property of the vehicle or a property of a component of the vehicle, the first electrical output received from the sensor while the sensor is submitted to a first input condition, the first electrical output representing a lower limit of a measurement range of the sensor;

receive a second electrical output generated by the sensor while the sensor is submitted to a second input condition, the second electrical output representing an upper limit of the measurement range of the sensor;

obtain a first reference value that corresponds to the lower limit of the measurement range and a second reference value that corresponds to the upper limit of the measurement range;

determine a drift function of the sensor based on a value of the first electrical output, a value of the second electrical output, the first reference value, and the second reference value, wherein the drift function is based on a slope for a first offset value and a second offset value, and wherein the first offset value is based on the first reference value and the second reference value, and the second offset value is based on the first electrical output and the second electrical output;

input a value of a raw electrical output generated by the sensor into the drift function to determine an adjusted value of the raw electrical output, wherein a percent change of the first offset value or the adjusted value is within a designated threshold value to calibrate the sensor; and determine a measured value of the property monitored by the sensor by inputting the adjusted value of the raw electrical output into a second function.

* * * * *